United States Patent [19]
Odachi et al.

[11] Patent Number: 5,893,437
[45] Date of Patent: Apr. 13, 1999

[54] NON-CONTACT ELECTRIC POWER SUPPLYING SYSTEM FOR A VEHICLE

[75] Inventors: Yasuharu Odachi; Masaki Takasan, both of Aichi, Japan

[73] Assignee: Kabushiki Kaisha Toyoda Jidoshokki Seisakusho, Kariya, Japan

[21] Appl. No.: 08/907,134

[22] Filed: Aug. 6, 1997

[51] Int. Cl.$^6$ .................................... B60L 9/00
[52] U.S. Cl. .................................... 191/10
[58] Field of Search .................. 191/10; 104/290, 104/292, 293, 294; 310/12; 318/16; 320/109; 336/84 R, 84 C, 84 M

[56] References Cited

U.S. PATENT DOCUMENTS

| | | | |
|---|---|---|---|
| 5,467,718 | 11/1995 | Shibata et al. | 104/293 |
| 5,469,036 | 11/1995 | Eto | 318/16 |
| 5,551,350 | 9/1996 | Yamada et al. | 191/10 |

FOREIGN PATENT DOCUMENTS

| | | |
|---|---|---|
| 5207606 | 8/1993 | Japan. |
| 6153305 | 5/1994 | Japan. |

*Primary Examiner*—Mark Tuan Le
*Attorney, Agent, or Firm*—Morgan & Finnegan, LLP

[57] ABSTRACT

A feeder is disposed along a guide rail that guides an electrically powered vehicle. The electrically powered vehicle has an electric power receiving unit that surrounds the feeder on a non-contact basis. Electric power is supplied from the feeder to the electrically powered vehicle through electric power receiving units. The number of electric power receiving units is two. Each of the electric power receiving units has a mechanism that causes the electric power receiving unit to be inclined in the tangent direction of the feeder at a curved portion of the guide rail in such a manner that the distance between the feeder and the electric power receiving unit is kept so that optimum power can be obtained.

13 Claims, 12 Drawing Sheets

NON-CONTACT ELECTRIC POWER SUPPLYING SYSTEM FOR A VEHICLE

BACKGROUND OF THE INVENTION

1. Field of the Invention

The present invention relates to a non-contact type electric power supplying system for supplying electric power to an electrically powered vehicle on a non-contact basis.

2. Description of the Related Art

Electrically powered vehicles, such as transportation means such as electric train carriages and monorails, and self-guided vehicles that carry parts and so forth in factories, and so forth are known.

As one means for supplying electric power to such electrically powered vehicles, a charging station system has been implemented for electric vehicles. However, in the charging station system, whenever the electric power of the battery of the vehicle begins to run out, the user thereof should drive the vehicle to a charging station and charge it with electric power. Thus, when a parts conveying system in a factory is operated using such a charging system, the operating efficiency is low.

To solve this problem, an electric power supplying system is used. In the electric power supplying system, as in monorails, a contact-type of electric power supplying system has been proposed. However, in this system, since the contact portions get worn, they should be maintained and periodically replaced with new ones. Moreover, in the contact-type electric power supplying system, since the contact portions are subject to sparking, such a system cannot be used in an explosion-protected area.

To solve such problems, non-contact type electric power supplying systems have been proposed. FIG. 1 is a schematic diagram of a conventional non-contact type power supplying system. In FIG. 1, a guide rail 1 is disposed and supported by a rail support member 1a on a ceiling or the like. A vehicle 2 that is suspended and moved by a roller (not shown) is disposed on the guide rail 1. An electric power receiving unit 3 is disposed in the vehicle 2. The electric power receiving unit 3 is mounted on the vehicle 2 through a base portion 5 supported with a shaft 4.

FIG. 2 is a sectional view taken along lines 2—2 of FIG. 1. FIG. 2 shows a cross section of the guide rail 1 and the electric power receiving unit 3. The guide rail 1 has a bracket "]" shaped section. Two feeders 6 are disposed on a side surface of the guide rail 1 and supported by support members 7. In other words, the feeders 6 are located along the guide rail 1. The electric power receiving unit 3 has an E-shaped section. A secondary coil 9 is disposed at a center convex portion of the electric power receiving unit 3. The electric power receiving unit 3 is made of silicon steel. Each of the feeders 6 is located within the respective concave portions of the E-shaped section of the electric power receiving unit 3.

When an AC current with a predetermined frequency (for example, 10 kHz) is supplied to the feeders 6 from an AC power supply (not shown), a voltage is induced in the secondary coil 9 of the electric power receiving unit 3. In other words, when an AC current with a predetermined frequency is supplied to the feeders 6, a magnetic circuit is formed around the feeders 6 through the electric power receiving unit 3 and a part of the guide rail 1. Thus, a voltage is induced in the secondary coil 9 due to electromagnetic induction. The voltage (electric power) obtained in such manner is used to move the vehicle 2.

The voltage induced by the secondary coil 9 is obtained by an AC magnetic field that generates a high frequency current that flows in the feeders. Thus, when the distance between the feeders 6 and the electric power receiving unit 3 (for example, the distance L from an edge surface of the electric power receiving unit 3 to the feeders 6 shown in FIG. 2) varies, the induced voltage varies. When the guide rail 1 is straight, the distance between the feeders 6 and the electric power receiving unit 3 is nearly constant. Thus, the voltage induced by the secondary coil 9 does not appreciably deviate.

However, since the guide rail 1 is disposed in, for example a factory, it has a curved portion as well as a straight portion. For example, as shown in FIG. 1, as with a corner portion of a conveying system, the guide rail 1 has a curved portion. The above-described distance L deviates by $+\Delta L$ or $-\Delta L$. This deviation is proportional to the length of the electric power receiving unit 3 (namely, the length B of the core of the electric power receiving unit 3 (see FIG. 1)). Thus, the induced voltage decreases corresponding to the amount of the deviation.

In other words, as shown in FIG. 1, the electric power receiving unit 3 has a predetermined length B in the moving direction of the vehicle 2. Thus, when the vehicle 2 passes through the corner portion, the relative position of the feeders 6 within the electric power receiving unit 3 is denoted by a curved feeder line 6 shown in FIG. 3. On the other hand, assuming that an optimum position in which the electric power receiving unit 3 most effectively receives electric power from the feeders 6 is in the range denoted by dashed lines shown in FIG. 4, the corner portions 3a and 3b of unit 3 as shown in FIG. 3 are not preferable for the electric power receiving unit 3 to receive electric power (the dashed lines shown in FIG. 3 correspond to the optimum position shown in FIG. 4). Thus, a leakage flux or the like increases and thereby sufficient electric power cannot be supplied to the vehicle 2.

SUMMARY OF THE INVENTION

An object of the present invention is to provide a non-contact type electric power supplying system that sufficiently supplies electric power to a vehicle that moves along a guide rail, regardless of whether the vehicle moves along a curved portion of the guide rail, without decreasing the power supply efficiency.

The present invention is a non-contact type electric power supplying system for supplying electric power to a vehicle that moves along a rail on a non-contact basis, comprising a voltage outputting means having a plurality of electric power receiving units disposed in the vehicle at predetermined intervals along the rail, the electric power receiving units receiving electric power from a feeder disposed along the rail and to which a current is supplied, and an electric power receiving unit positioning means for causing the individual electric power receiving units to be positioned in their directions along the rail so that the output voltage of the voltage outputting means becomes maximum.

Thus, according to the present invention, since voltages are induced by a plurality of electric power receiving units, the length of each electric power receiving unit can be reduced. Consequently, the deviation between the feeder and each of the electric power receiving units can be decreased at corner portions.

In addition, the electric power receiving unit positioning means causes the direction of each electric power receiving unit along the rail to be positioned parallel to the tangential direction of the feeder so that the voltage that each electric power receiving unit converts from the magnetic flux generated by the feeder becomes maximum. Thus, each electric power receiving unit obtains the maximum output voltage corresponding to the magnetic flux established by the feeder.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, an embodiment of the present invention will be described.

Figure 5:
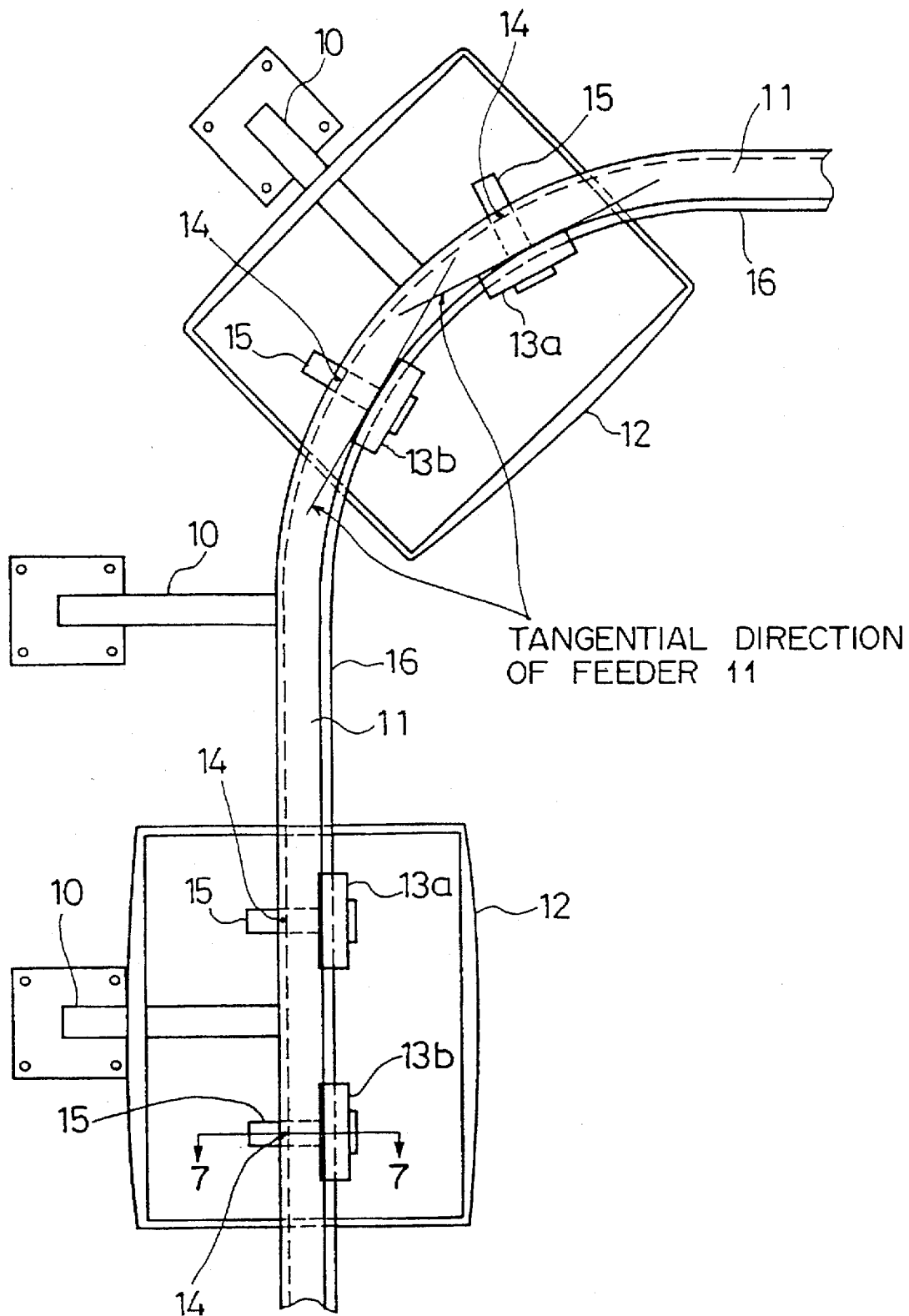
FIG. 5 is a schematic diagram showing the overall structure of a non-contact type electric power supplying system according to an embodiment of the present invention.

FIG. 5 is a schematic diagram showing the overall structure of a non-contact type electric power supplying system for supplying electric power to a self-guided parts-conveying vehicle. Referring to FIG. 5, a guide rail 11 is supported by rail support members 10 fixed on a ceiling or the like. Two vehicles 12 are shown suspended and moved by rollers (that will be described later) on the guide rail 11. Each vehicle 12 drives and controls a working motor (not shown) with electric power supplied from electric power receiving units 13a, 13b thereon. The traveling motor rotates the rollers and thereby the vehicle 12 travels along the guide rail 11.

Figure 6:
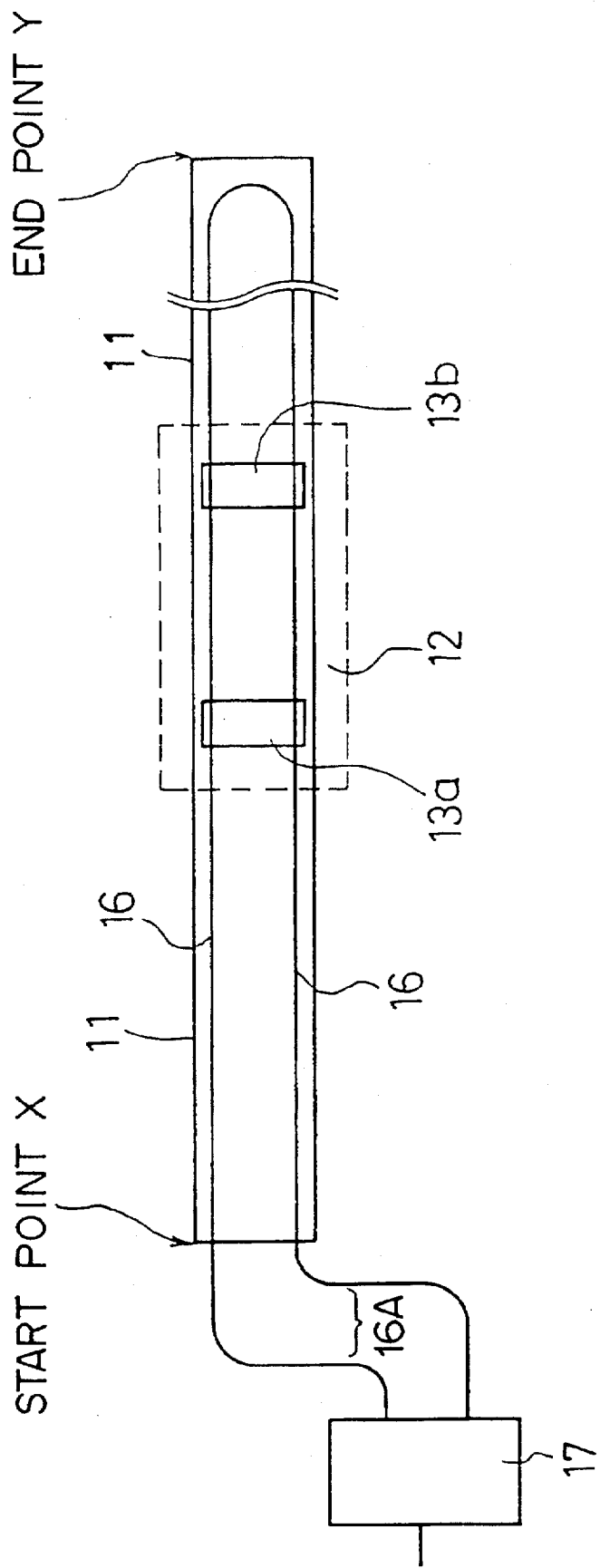
FIG. 6 is a schematic diagram showing in side elevation a system structure of the non-contact type electric power supplying system according to the embodiment of the present invention.
Figure 7:
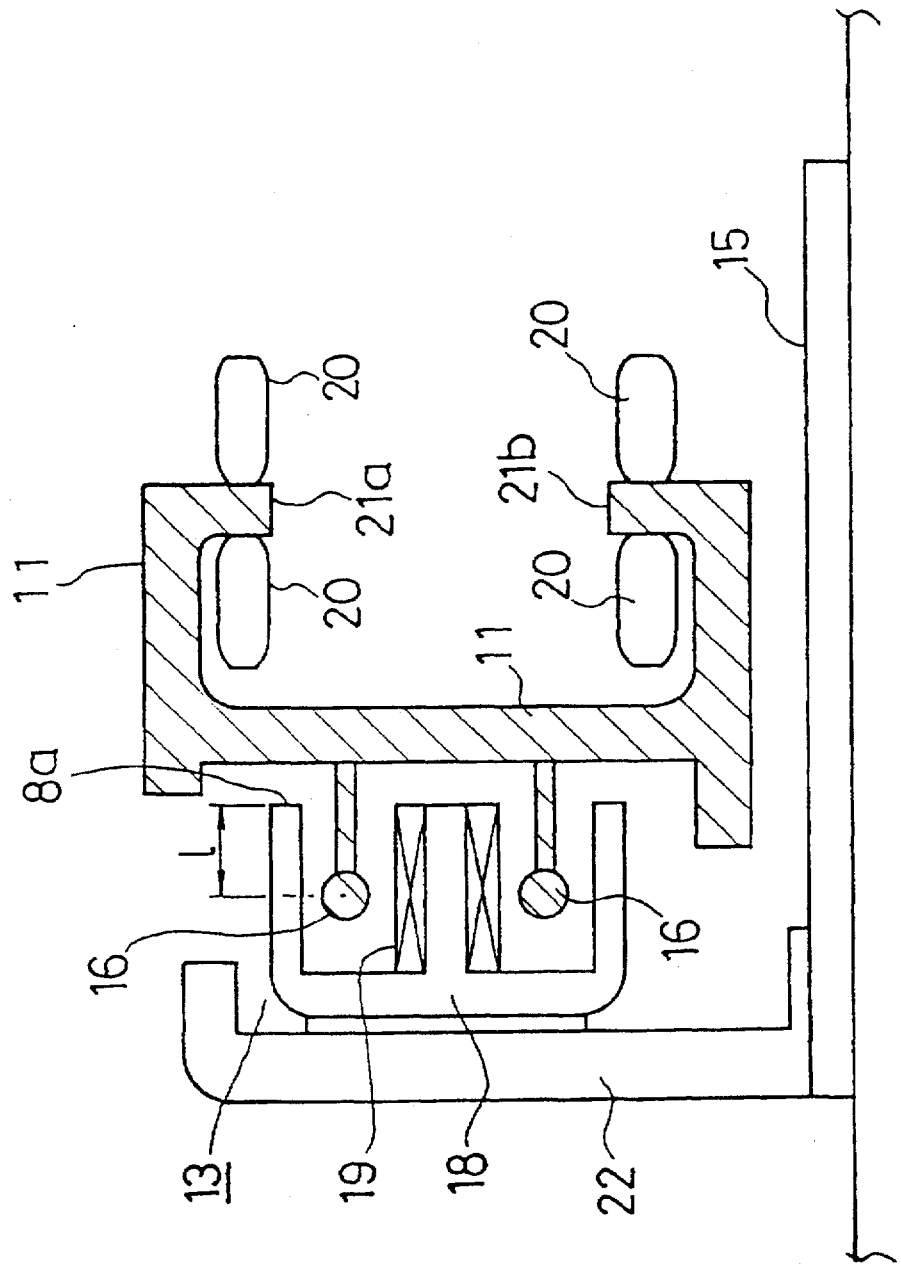
FIG. 7 is a sectional view taken at lines 7—7 in FIG. 5 for explaining the relation between an electric power receiving unit and a guide rail.

FIG. 6 is a schematic diagram showing the overall structure of the guide rail 11. The guide rail 11 is disposed along a traveling path of the self-guided vehicle 12 (denoted by dashed lines in FIG. 6) that conveys parts. A feeder 16A is disposed along the guide rail 11. The feeder 16A is made of a copper line that is insulated from the guide rail 11. The feeder 16A is routed in a vertically disposed U-shape from a start point Y to an end point Y of the guide rail 11, to provide the pair of vertically spaced feeders 16 as shown in FIG. 7. A radio frequency current at a frequency of, for example, 10 kHz is supplied from an AC power supply 17 to the feeder 16. The vehicle 12 has the electric power receiving units 13a and 13b as a voltage outputting means. The two electric power receiving units 13a and 13b are pivotally disposed on the vehicle 12.

FIG. 7 is a sectional view taken along lines 7—7 of FIG. 5. FIG. 7 shows a cross section of the guide rail 11 and one of the electric power receiving units 13. A hatched portion shown in FIG. 7 shows the guide rail and the feeders 16 according to the embodiment of the present invention. The guide rail and the feeders 16 are securely disposed. The guide rail 11 is securely affixed to the ceiling or the like with the rail support members 10.

On the other hand, the vehicle 12 is moved along the guide rail 11 by the rollers 20. In other words, the rollers 20 engage both side portions 21a and 21b of the guide rail 11 so that the vehicle 12 is movable in the perpendicular direction of the drawing. In addition, the electric power receiving units 13a and 13b are disposed on a base portion 15 through respective brackets 22. The electric power receiving units 13a and 13b are made of silicon steel (for example, silicon steel plate or silicon steel belt) 18 formed in an E-shape. The two feeder portions 16 are located respectively at nearly center positions of the two concave portions of the E-shaped silicon steel 18.

In such a structure, when the AC power supply 17 (see FIG. 6) supplies an AC current at a predetermined frequency (for example 10 kHz) to the feeder 16A, the magnetic flux generated around each feeder 16 flows in the E-shaped silicon steel 18. Thus, a voltage is induced in a secondary coil 19 due to electromagnetic induction. The voltage induced in the secondary coil 19 is supplied to a battery (not shown) and used to drive the traveling motor of the vehicle 12.

Figure 3:
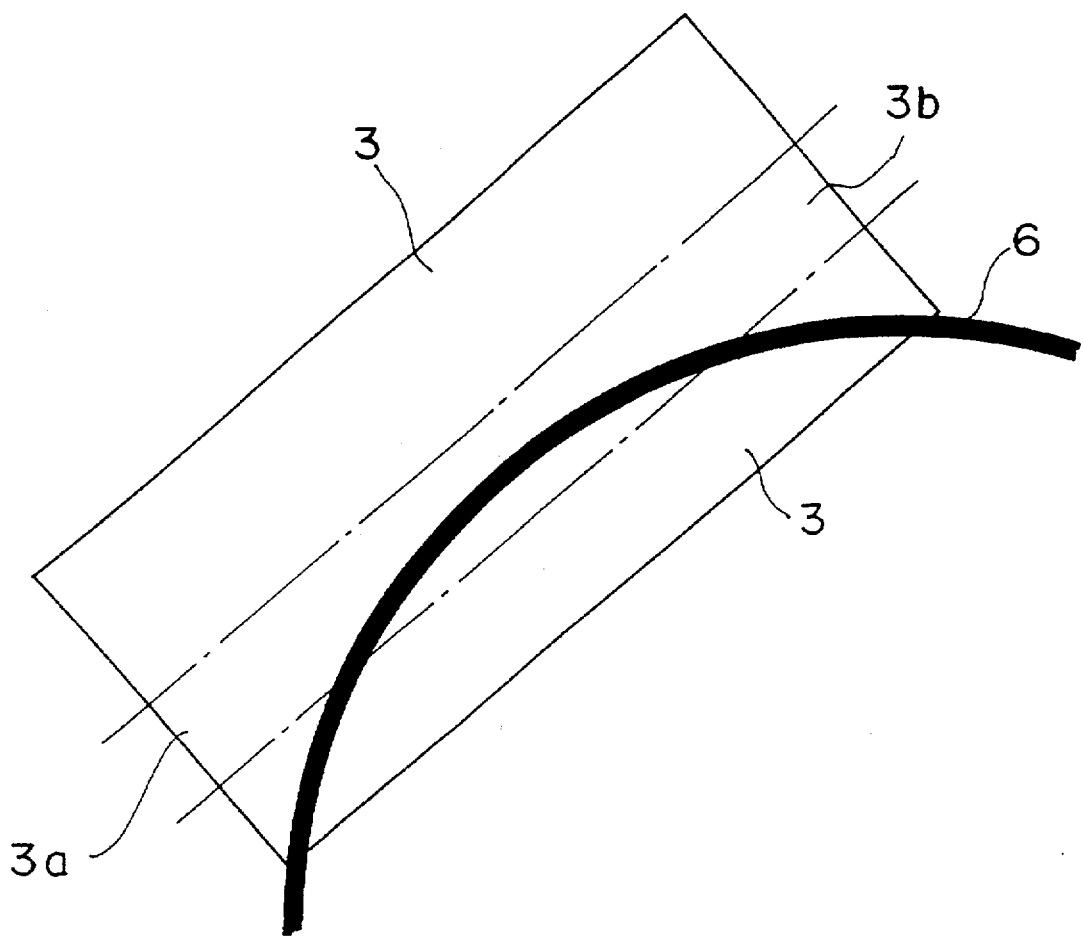
FIG. 3 is a schematic diagram for explaining a problem of the prior art at the corner portion of the guide rail.
Figure 8:
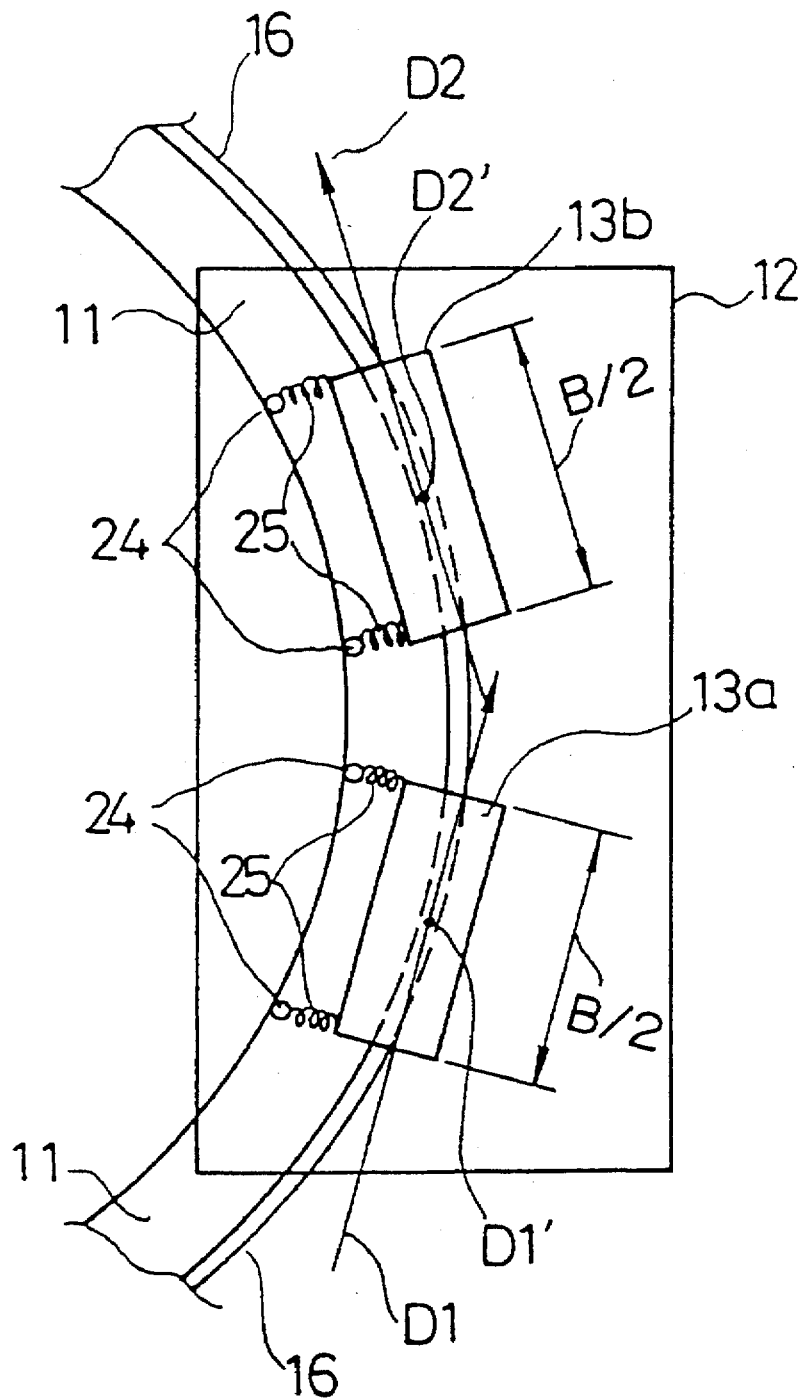
FIG. 8 is a schematic diagram for explaining the position of the electric power receiving unit with reference to the guide rail at a corner portion.
Figure 9:
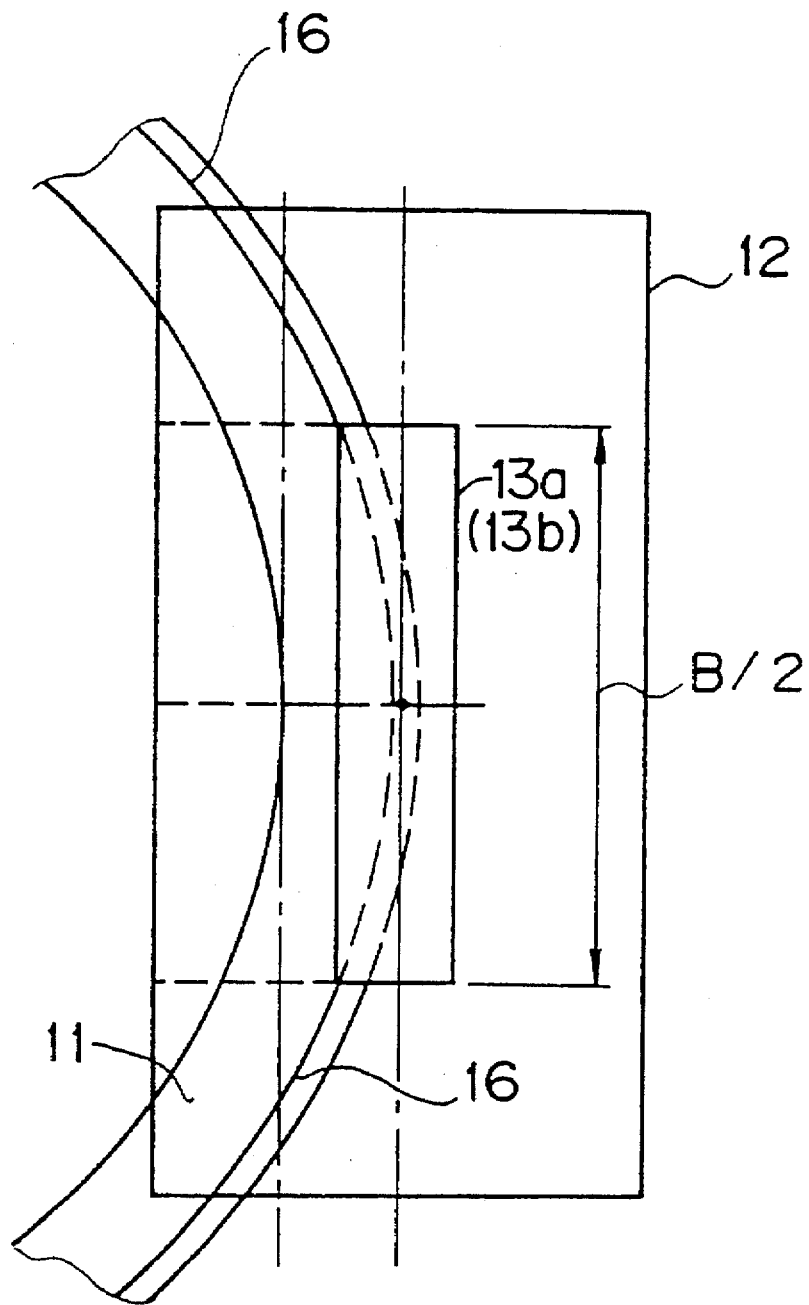
FIG. 9 is a schematic diagram for explaining the relation between a single electric power receiving unit and a corner portion of the guide rail.

Next, a mechanical structure by which each electric power receiving unit 13a and 13b passes around a curved portion of the guide rail 11, as at a corner portion of a conveying system, will be described. FIG. 8 shows the positions of the vehicle 12 and the electric power receiving units 13a and 13b at a curved portion of the guide rail 11. To compare the structure of the present invention to the structure of the related art reference as shown in FIG. 3, FIG. 9 also shows the relation between a pair of feeders 16 and the single electric power receiving unit 13 of the invention at a corner portion of the guide rail 11.

Figure 1:
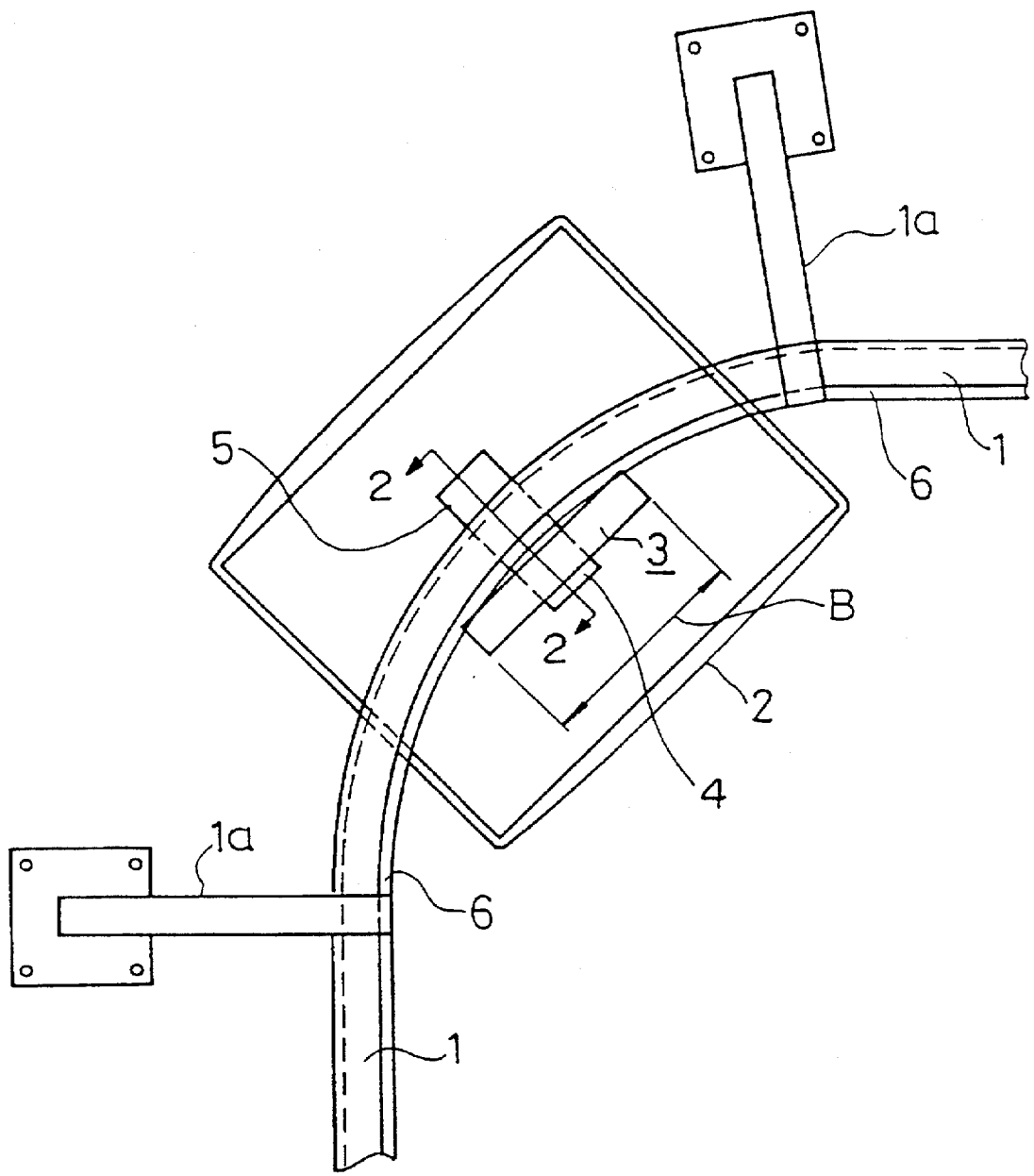
FIG. 1 is a schematic diagram for explaining the relation of an electric power receiving unit and a vehicle according to a related prior art reference.
Figure 2:
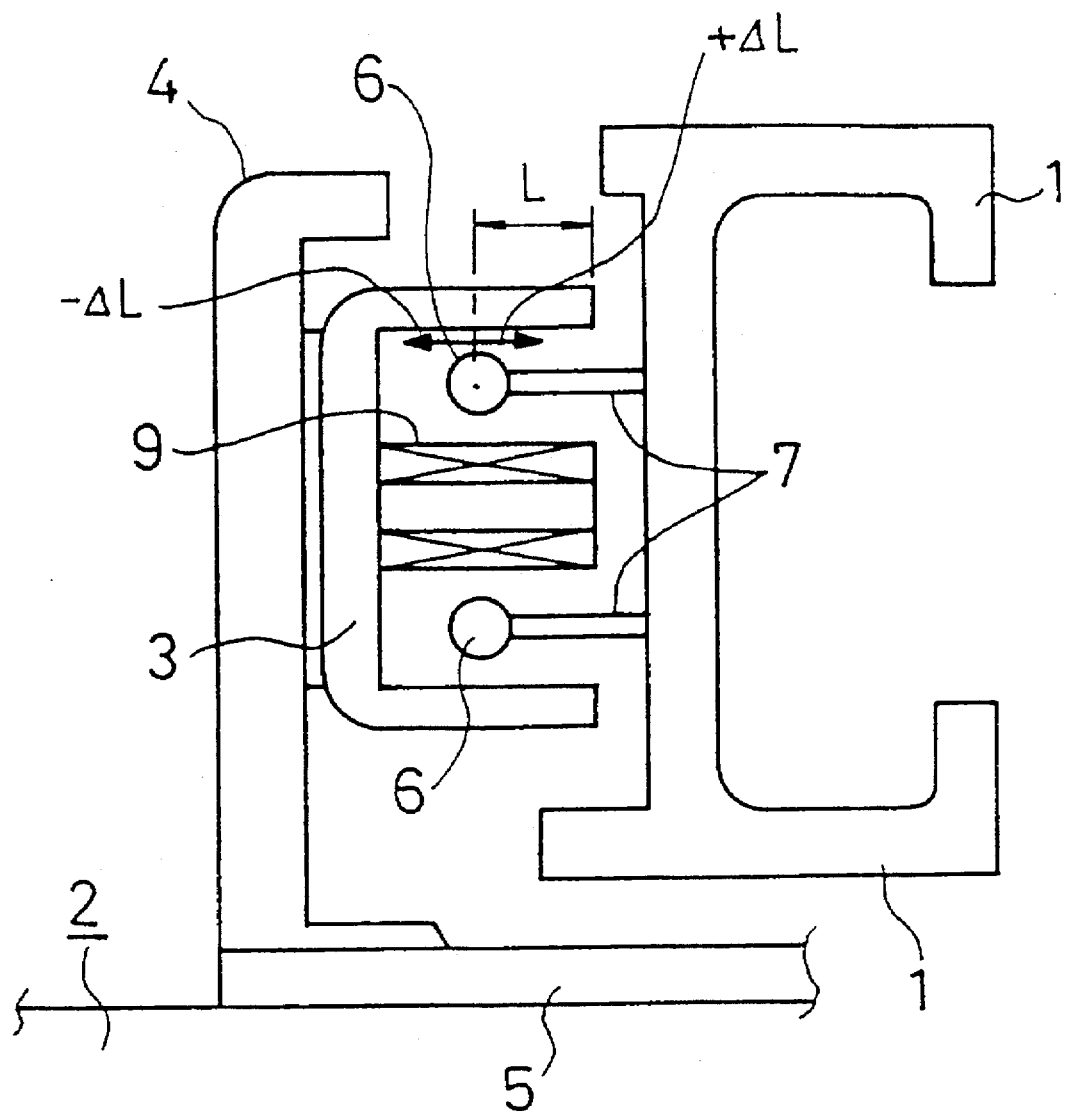
FIG. 2 is a sectional view taken at lines 2—2 of FIG. 1 for explaining the relation between the electric power receiving unit and a guide rail according to the related art reference.
Figure 4:
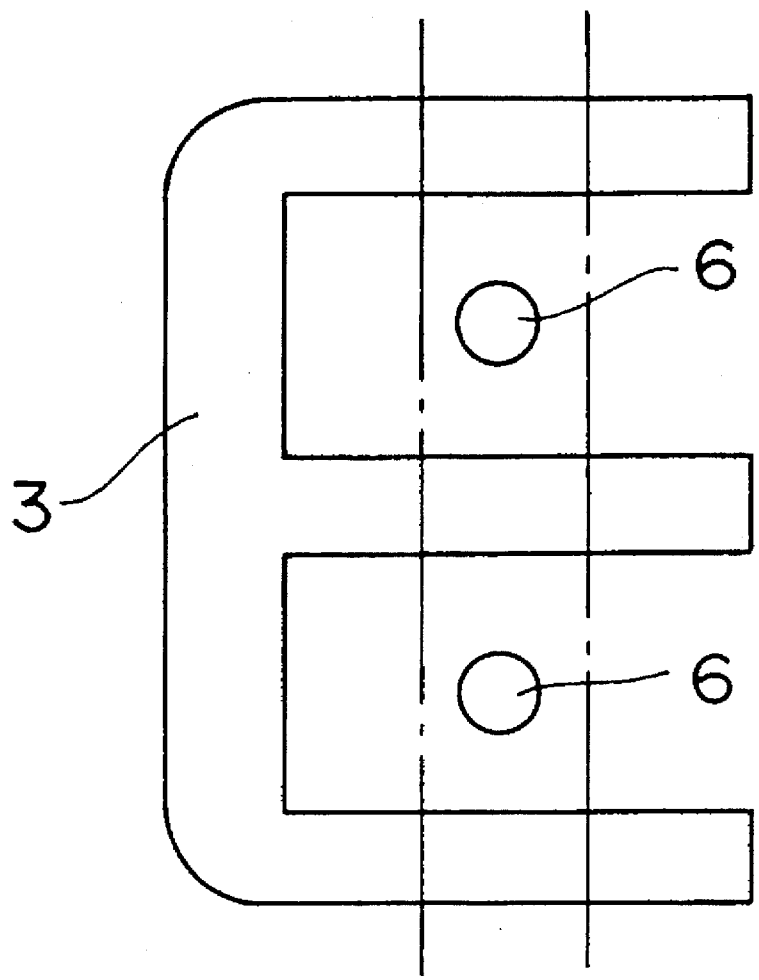
FIG. 4 is a schematic diagram showing an optimum position range of a feeder with reference to the electric power receiving unit.

According to the embodiment of the present invention, the electric power receiving unit 13 is divided into two electric power receiving units 13a and 13b. Output voltages of the electric power receiving units 13a and 13b are connected in series and used. In other words, the length of the E-shaped silicon steel 18 that composes the electric power receiving unit 13a or 13b is ½ of the length B (FIG. 1) of the silicon steel according to the related art reference. (In other words, the length of the E-shaped silicon steel 18 according to the embodiment is B/2.) As shown in FIG. 8, rollers 24 and springs 25 as an electric power receiving unit positioning means used in the electric power receiving units 13a and 13b cause the E-shaped silicon steel 18 to be positioned parallel to the tangential directions (for example, D1 and D2 in FIG. 8) of the feeders 16. In FIG. 8, D1' and D2' represent center points of D1 and D2, respectively. Thus, as compared with FIGS. 3 and 4, FIG. 9 shows that the feeders 16 continue to be disposed within the receiving unit 13a or 13b at the optimum position, as indicated in dashed lines in FIG. 9.

Figure 10:
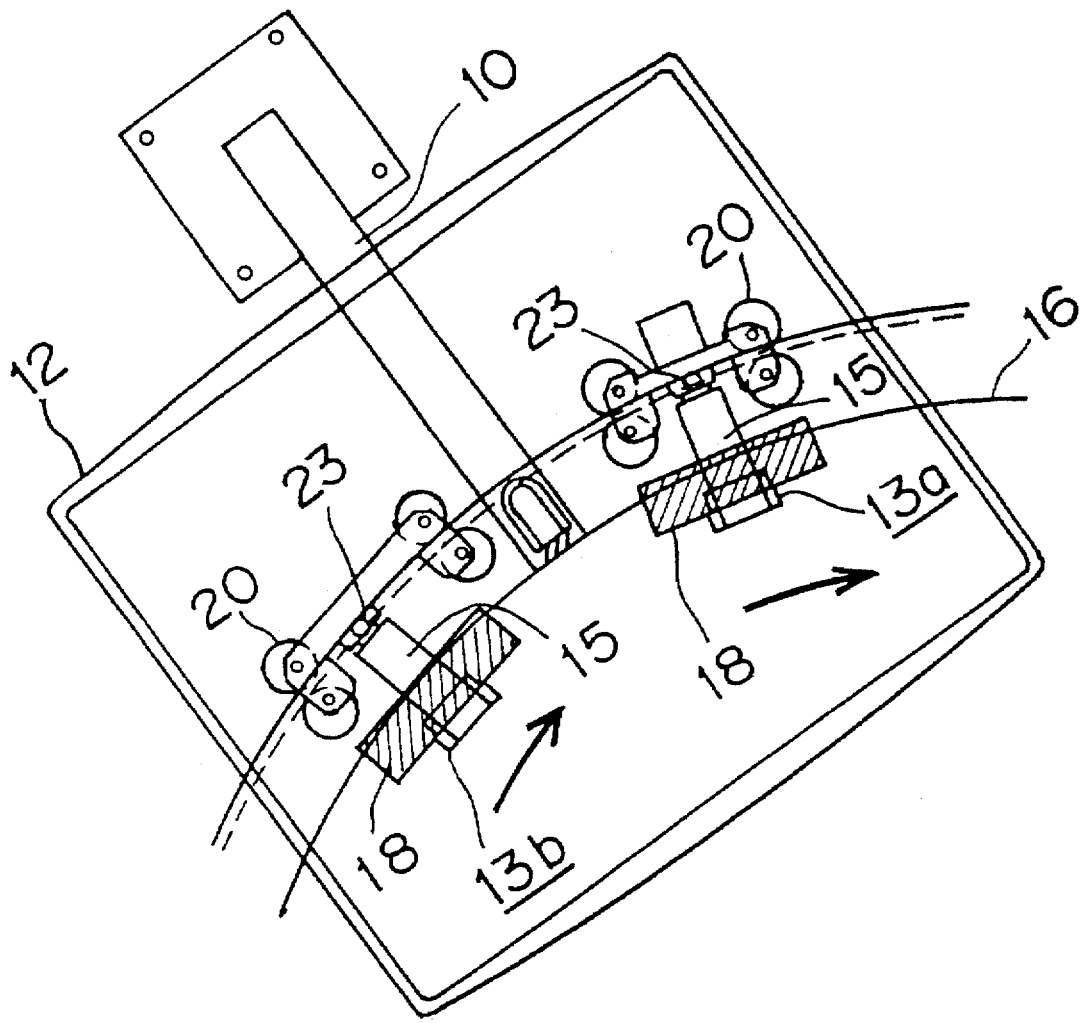
FIG. 10 is a schematic diagram for explaining a mechanical structure of the electric power receiving unit at a corner portion.
Figure 11:
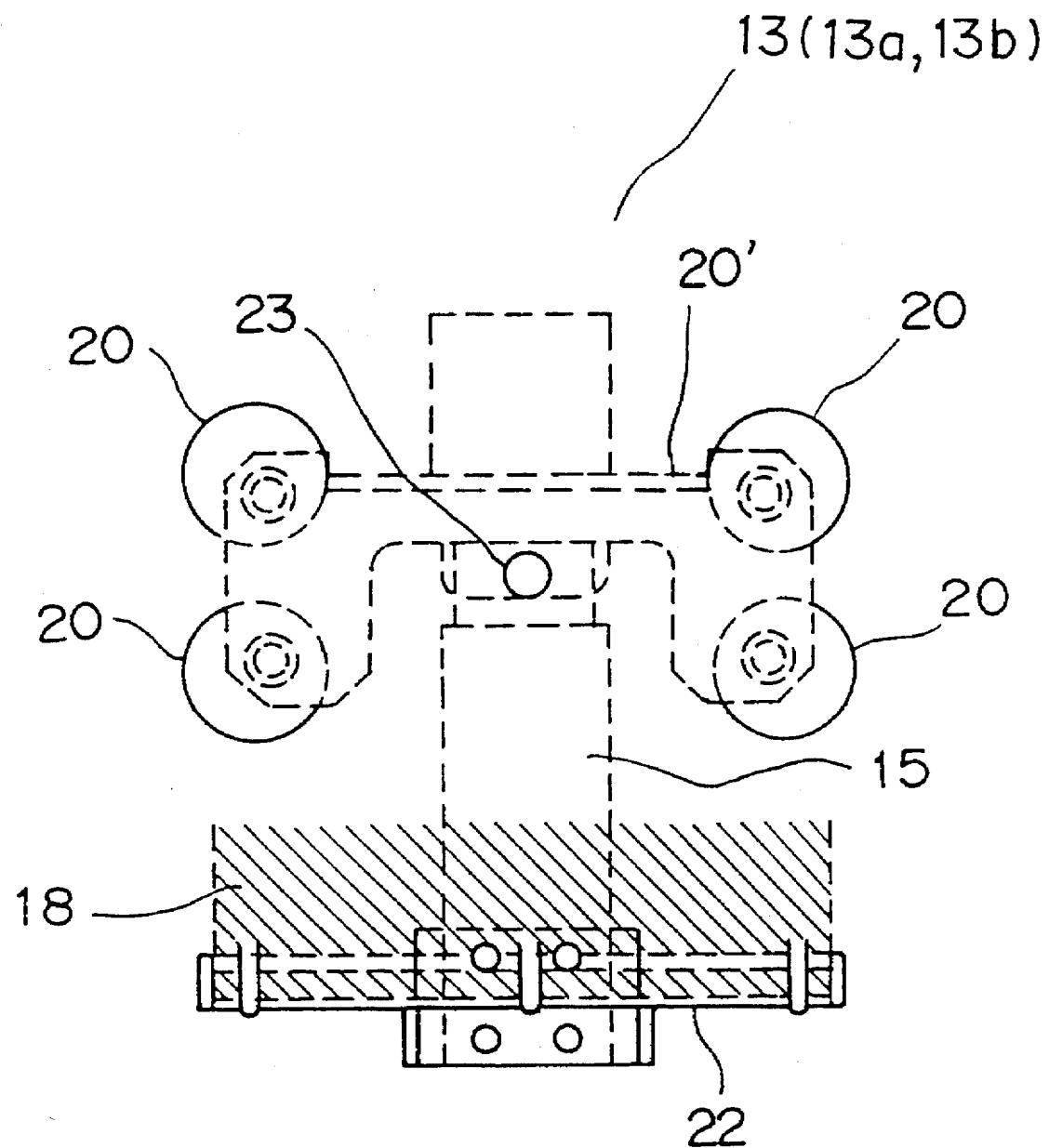
FIG. 11 is a schematic diagram showing a real mechanical structure of the electric power receiving unit.

FIG. 10 is a schematic diagram showing the mechanism of the electric power receiving unit positioning means. FIG. 11 is an enlarged view in the vicinity of the electric power receiving unit 13 (13a and 13b). Since the structure of the electric power receiving unit 13a is the same as the structure of the electric power receiving unit 13b, for simplicity, the mechanism of the electric power receiving unit positioning means of only the electric power receiving unit 13a will be described.

As described above, the electric power receiving unit 13a (13b) is disposed in the vehicle 12 through the base portion 15 (see FIG. 7). In reality, a shaft 23 is pivotally disposed on the vehicle 12 in the vertical direction of the drawing of FIG. 10. In addition, a roller hold portion 20' supporting the rollers 20 is disposed at one end of the base portion 15 (see FIG. 11). As described above, as the rollers 20 rotate along the guide rail 11, the electric power receiving unit 13a is moved along the guide rail 11 by the base portion 15 along with the vehicle 12.

When the electric power receiving unit 13a is moved, since the shaft 23 is pivotal with reference to the base portion 15, the electric power receiving unit 13a is inclined along the guide rail 11 as shown in FIG. 10. Thus, the electric power receiving unit 13a is positioned parallel to the tangential direction of the feeders 16. At this point, the springs 25 (see FIG. 8) cause the electric power receiving unit 13a to be positioned parallel to the tangential direction of the feeders 16.

This mechanism applies to the electric power receiving unit 13b. Since the shaft 23 disposed on the base portion 15 of the electric power receiving unit 13 is moved along the curve of the guide rail 11, the electric power receiving unit 13b is inclined along the guide rail 11 as shown in FIG. 8. Likewise, the springs 25 cause the electric power receiving unit 13b to be positioned parallel to the tangential direction of the feeders 16.

Figure 12:
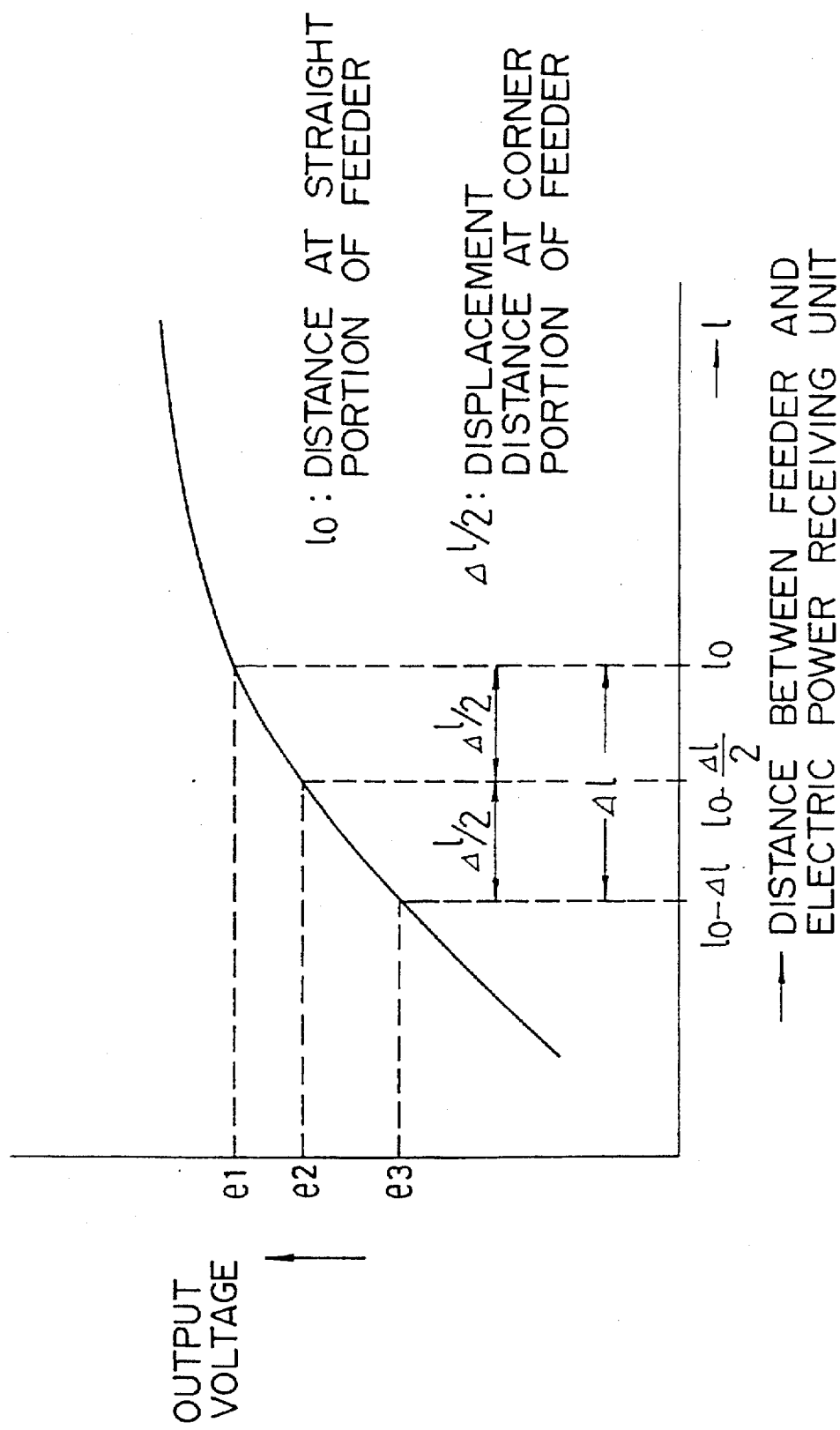
FIG. 12 is a schematic diagram showing the effect of the non-contact type electric power supplying system according to the present invention.

According to the embodiment of the present invention, unlike with the conventional system, a problem of the output voltage drop of the electric power receiving unit can be solved. In other words, when the feeders 16 and the electric power receiving unit 13 are at position $l_0$ at a straight portion of the feeders 16, this position at the center portion of the E-shaped silicon steel 18 is the same as that of both end portions thereof. Thus, at this position, the maximum output voltage is obtained (as denoted as output voltage e1 of FIG. 12).

Conventionally, the length of the E-shaped silicon steel 3a, 3b (FIG. 3) at the corner portion is large (for example, length B). Thus, the distance between the feeder 16 and the electric power receiving unit 3 becomes short (for example, $l-\Delta l$). Thus, the output voltage decreases (as denoted by output voltage e3 of FIG. 12). However, according to the embodiment of the present invention, when the electric power receiving unit 13 is divided into two shorter electric power receiving units 13a and 13b and their output voltages are connected in series, the distance between the feeder 16 and each of the electric power receiving units 13a and 13b is halved (namely, $l_0-\Delta l/2$). Thus, the decrease of the output voltage is reduced (as denoted by output voltage e2 of FIG. 12). Thus, even if the vehicle passes around a curved portion, an output voltage similar to that at a straight portion can be obtained.

According to the embodiment of the present invention, two electric power receiving units are disposed at a front portion and a rear portion of the vehicle 2. However, the number of electric power receiving units is not limited to two. When many electric power receiving units are disposed, electric power can be more effectively obtained by the vehicle 12 at a corner portion of the guide rail.

In addition, according to the embodiment of the present invention, E-shaped silicon steel is used. However, ferrite may be used instead of silicon steel.

As described above, according to the non-contact type electric power supplying system of the present invention, since the electric power receiving unit is divided into two or more portions and the divided electric power receiving units are connected in series, even if the vehicle passes around a corner portion, electric power can be effectively supplied to the vehicle.

Thus, in a parts-conveying system used in a factory, electric power can be stably supplied. Thus, the decrease of the work efficiency can be suppressed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A non-contact electric power supplying system for supplying electric power to a vehicle that moves along a rail, the system comprising:

voltage outputting means comprising a plurality of individual electric power receiving units for receiving electric power from feeders disposed along the rail to which a current is supplied;

means for pivotally connecting the electric power receiving units to the vehicle at predetermined intervals along the rail; and electric power receiving unit positioning means for separately pivoting each of the individual electric power receiving units with respect to the vehicle as the vehicle moves along the rail so that the output voltage of said voltage outputting means becomes maximum.

2. The non-contact power supplying system as set forth in claim 1, wherein the voltage output by said voltage outputting means is due to electromagnetic induction of magnetic flux generated by supplying a current to the feeder.

3. The non-contact electric power supplying system as set forth in claim 1, wherein said electric power receiving unit positioning means comprises first and second rollers and first and second springs corresponding to each electric power receiving unit, the first and second rollers for engaging and rotating along the rail, the first and second springs each having one end connected to a corresponding electric power receiving unit and another end connected to the first and second rollers, respectively, for separately pivoting each of the electric power receiving units.

4. The non-contact electric power supplying system as set forth in claim 1, wherein the number of the electric power receiving units is two.

5. The non-contact electric power supplying system as set forth in claim 1,
wherein said electric power receiving unit positioning means separately maintains each of said electric power receiving units substantially parallel to a tangential direction of the feeder as the vehicle moves along straight and curved portions of the rail.

6. A system for supplying electric power on a non-contact basis to a vehicle moving along a rail to which current is supplied, the system comprising:
first and second electric power receiving units for receiving electric power from the feeders disposed along the rail;
connecting means for pivotally connecting each electric power receiving unit to the vehicle; and
first and second positioning means for pivoting the first and second electric power receiving units with respect to the vehicle, such that each of the electric power receiving units is maintained substantially parallel to a direction tangent to the feeder as the vehicle moves along the rail.

7. The system of claim 6, wherein the connecting means comprises first and second shafts for pivotally connecting the first and second electric power receiving units to the vehicle, respectively.

8. The system of claim 7, wherein each of the first and second positioning means comprise first and second rollers supported for engaging and rolling along the rail, and first and second springs having first ends connected to opposing ends of each electric power receiving unit and second ends supported proximate to the first and second rollers.

9. The non-contact power system of claim 8, wherein each of the first and second positioning means further comprises third and fourth rollers and a support, wherein the first and second rollers are connected to the support and the third and fourth rollers are connected to the support opposite to the first and second rollers, respectively, the first and third rollers and the second and fourth rollers defining respective clearances therebetween for receiving a portion of the guide rail.

10. An electrically powered vehicle for moving along a rail to which current is supplied, the rail including feeders disposed along its length for providing electric power to the vehicle on a non-contact basis, the vehicle comprising:
a vehicle body;
first and second electric power receiving units for receiving electric power from the feeders;
connecting means for pivotally connecting the first and second electric power receiving units to the vehicle; and
first and second positioning means for pivoting the first and second electric power receiving units with respect to the vehicle, such that each of the electric power receiving units is independently maintained substantially parallel to a direction tangent to the feeder as the vehicle moves along the rail.

11. The vehicle of claim 10, wherein the connecting means comprises first and second shafts for pivotally connecting the first and second electric power receiving unit to the vehicle body, respectively.

12. The vehicle of claim 11, wherein each of the first and second positioning means comprises first and second rollers supported for engaging and rolling along the rail, the first and second springs having first ends connected to opposing ends of each of the electric power receiving units and second ends supported proximate the rollers.

13. The non-contact power system of claim 12, wherein the positioning means further comprises third and fourth rollers and a support, wherein the first and second rollers are connected to the support and the third and fourth rollers are connected to the support opposite to the first and second rollers, respectively, the first and third rollers and the second and fourth rollers defining respective clearances for receiving a portion of the guide rail.

* * * * *

UNITED STATES PATENT AND TRADEMARK OFFICE
CERTIFICATE OF CORRECTION

PATENT NO. : 5,893,437
DATED : April 13, 1999
INVENTOR(S) : Y. Odachi, et. al.

It is certified that error appears in the above-identified patent and that said Letters Patent is hereby corrected as shown below:

Column 3, line 56, after "a seld-guided" insert --,--

Column 4, line 6, after "11" delete "." and insert a --,--.

Signed and Sealed this

Fourth Day of April, 2000

Q. TODD DICKINSON

*Attest:*

*Attesting Officer*      *Director of Patents and Trademarks*